July 3, 1934. O. LUNDBERG 1,964,921
WATER SUPPLY COCK
Filed July 7, 1931
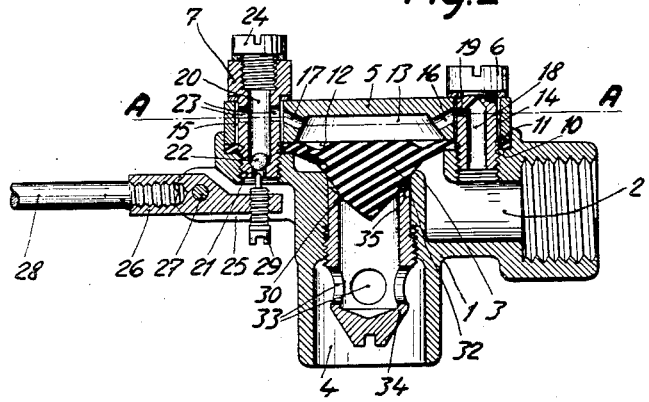
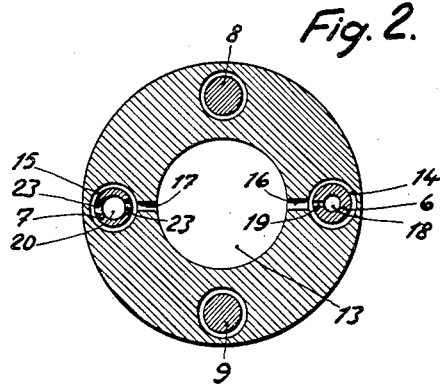
Inventor:
Olof Lundberg
By Emil Bönnelycke
Attorney Patented July 3, 1934

1,964,921

UNITED STATES PATENT OFFICE 1,964,921

WATER-SUPPLY COCK

Olof Lundberg, Saltsjobaden, Sweden

Application July 7, 1931, Serial No. 549,222
In Sweden June 19, 1930

5 Claims. (Cl. 137—93)

The present invention relates to a water-supply cock with a main valve, a by-valve and a diaphragm, and its object is to effect a gradual bumpless closure and to make the members necessary for this purpose easily accessible to adjustment and cleaning from soil which might be in the water.

An embodiment of a water-supply cock carried out according to the present invention is shown in the accompanying drawing in which Figure 1 is a vertical section through the cock, and Figure 2 is a horizontal section on the line 2—2 of Figure 1.

The valve casing 1 of the cock is provided with an inlet pipe 2, a valve-seat 3 and an outlet pipe 4. At the upper portion of the valve casing is a cupular cover 5 secured by means of four screws 6, 7, 8 and 9 which are threaded into the valve casing. Between the turned annular surfaces 10 and 11 of the valve casing and the cover respectively is squeezed a diaphragm 12 of india-rubber so as to produce tightening between said surfaces. Between the diaphragm 12 and the cupular cover 5 is a chamber 13, the so-called pressure variation chamber. The holes in the cover 5 for the screws 6 and 7 are of a larger diameter than said screws so as to form annular channels 14 and 15 (see Figure 2) around the screws 6 and 7 respectively. In the cover 5 there are slots 16 and 17 connecting the chamber 13 to the annular channels 14 and 15.

The screw 6 which is threaded into a hole provided in the valve casing 1 and opening into the inlet pipe 2, is provided with a channel 18 extending from the lower portion of the screw 6 a distance upwards, so that the lower portion of the screw becomes hollow, and the wall of this lower portion of the screw is provided with a small channel 19 connecting the annular channel 14 to the channel 18.

The screw 7 which is threaded into a hole running through a projection of the valve casing 1 and opening outside the valve casing (in the atmosphere), is bored through by an axial channel 20, at the lower end of which a valve-seat 21 is provided on which a ball valve 22 (the by-valve) seats. The walls of the hollow screw 7 are bored through by two channels 23 connecting the annular channel 15 to the channel 20. The latter channel is at its upper end closed by a screw plug 24.

In projections 25 of the valve casing is a lever 26 mounted about the pin 27. Into one end of the lever 26 is threaded a rod 28 at which a float may be fixed in a suitable manner, and into the other end of the lever 26 a screw 29 is threaded so as to be adjustable vertically. The upper portion of the screw has a smaller diameter than the other portion of the screw and extends through the valve hole of the screw 7 up to the ball valve 22.

The diaphragm 12 is in its center portion formed as a valve body 30 (the main valve) seating against the valve-seat 3 in the valve casing of the cock. The valve body 30 is, below the portion seating against the valve-seat 3, formed as a cone 32, the so-called brake cone. Into the outlet pipe 4 of the valve casing is threaded a tube 34 provided with a bottom and lateral holes 33. The upper edge of the tube 34 is conically bevelled at 35, and the tube 34 is screwed into the outlet pipe 4 of the valve casing so far that the lower edge of the bevelling 35 comes into immediate vicinity of the brake cone 32 when the valve body 30 tightens against the valve-seat 3 in the valve casing 1 of the cock.

The described float cock operates in the following manner:

When the cock is closed there prevails, due to the channels 18, 19, 14 and 16 and the channels 17, 15, 23 and 20, the same water-pressure in the chamber 13 above the diaphragm 12 and in the hollow screw 7 over the ball valve 22 as in the valve casing 1 below the annular surface of the diaphragm 12. When the rod 28 in the lever 26 is lowered (for instance under the influence of a float secured thereto) the screw 29 raises the ball valve 22 so that the latter is removed from the seat 21. The water then flows through the channels 20, 23, 15 and 17 from the pressure variation chamber 13 into the atmosphere. Simultaneously, water flows through the permanently open channels 18, 19, 14 and 16 to the pressure variation chamber, but as the channel 19 in the screw 6 is considerably smaller in diameter than the diameter of the channel 20 in the screw 7 below the valve-seat 21, the pressure in spite thereof drops in the pressure variation chamber.

The water-pressure acting on the lower annular surface of the diaphragm 12 then presses the diaphragm 12 with the valve body 30 towards the cover 5, the valve body 30 being then removed from the seat 3, so that the water flows from the inlet 2 past the seat 3 through the outlet holes 33 into the outlet pipe 4. Thus the cock is open for as long a period as the rod 28 is lowered.

When the rod 28 is raised (for instance due to the floating power of a float secured thereto) the ball valve 22 is liberated from the screw 29 and falls down against the seat 21 and closes the channel 20 at the bottom. The flow from the pressure variation chamber 13 then ceases, but the flow to the same continues, and therefore the pressure rises in said chamber. When the pressure acting on the whole upper side of the diaphragm, has risen so much as to balance the water-pressure acting on the annular under-side of the diaphragm 12, the latter along with valve body 30 is lowered against the seat 3. When the brake cone 32 on the valve body 30 approaches the lower edge of the bevelling 35 of the tube 34 the outlet area is rapidly reduced just before a full tightening is produced between the valve body 30 and the seat 3 in the valve casing 1 of the cock. The pressure on the annular underside of the diaphragm is increased, and the closing motion of the valve body is throttled so that a gradual bumpless closure is obtained.

The throttling of the outlet area immediately before the closure of the cock should be adjustable at various water-pressures in such a way that the throttling becomes greater at higher water-pressure and smaller at lower water-pressure. Such an adjustment is easily obtained in cocks according to the present invention by more or less screwing in the tube 34, which is accessible from outside the cock, into the outlet pipe 4.

The defects which most often arise in cocks of a similar construction and which cause their coming out of function are that the small channel 19 controlling the water supply to the pressure variation chamber is choked up by soil in the water, and also that the by-valve corresponding to the ball valve 22 in the described cock becomes untight. Such defects in cocks according to this invention are easily remedied, without the necessity of disjoining the whole cock, simply by unscrewing the screws 6 and 7 respectively which has been defective, cleaning and adjusting the same and rescrewing it again into the casing of the valve.

Having now described my invention, what I claim as new and desire to secure by Letters Patent is:

1. In a water-supply cock having a valve casing, a diaphragm separating the casing into a pressure variation chamber and flow chamber, and in which said valve casing has a water inlet into the flow chamber and a discharge outlet therefrom, a valve seat surrounding the discharge outlet, a valve body formed integrally with the diaphragm and positioned centrally thereof, and adapted to be seated on and lifted from the valve seat in accordance with the variation in pressure in the pressure variation chamber, said valve body below a portion which seats on the valve seat in the valve casing being formed as a cone below which there is a beveling in the outlet of the valve casing arranged in such a way that said cone at the closing motion of the valve body approaches the lower edge of said beveling, the outlet area being thus rapidly reduced immediately before full seating takes place between the valve body and the seat, said beveling being provided on a special tube threaded into the outlet of the valve and accessible from the outside in such a way that the distance between the lower edge of the beveling and the cone of the valve body is adjusted by screwing in the tube provided with the beveling.

2. A valve structure comprising a valve casing having an inlet and an outlet, a valve seat surrounding the outlet, a valve body adapted to cooperate with said seat to control the flow of a fluid through the outlet, said valve body having a conical portion projecting into said outlet, and a tube axially adjustable in said outlet and provided with a beveled portion adapted to cooperate with the conical projection on the valve body to regulate the flow through the outlet as the valve body is moved toward its seat.

3. A valve structure comprising a valve casing having an inlet and an outlet, a valve seat formed about the periphery of said outlet, a valve body adapted to be moved onto and off of said seat, a tube axially adjustably mounted in said outlet, and a conical formation on said valve body projecting into the outlet and cooperating with one end of said tube to regulate the flow through the outlet as the valve body is moved toward its seat.

4. A valve structure comprising a valve casing having an inlet and an outlet, a valve seat formed about the periphery of said outlet, a valve body adapted to be moved onto and off of said seat, a tube mounted in said outlet for conveying fluid discharged through said outlet, the intake end of said tube being positioned adjacent the valve seat, a conical formation on said valve body projecting into the outlet and cooperating with the intake end of said tube for regulating the flow through the outlet as the valve body is moved toward its seat and cooperating screw threads provided on said tube and outlet for axially adjusting the tube in said outlet.

5. A valve structure comprising a valve casing having an inlet and an outlet, a valve seat surrounding the outlet, a valve body adapted to cooperate with said seat to control the flow of a fluid through the outlet, said valve body having a conical portion projecting into said outlet, and a tube axially adjustable in said outlet, said tube having an open end provided with a beveled portion adapted to cooperate with the conical projection on the valve body to regulate the flow through the outlet as the valve body is moved toward its seat and the other end of said tube being closed and provided with a plurality of openings in its side wall adjacent the end.

OLOF LUNDBERG.